US012791899B2

(12) United States Patent
Yoshida

(10) Patent No.: US 12,791,899 B2
(45) Date of Patent: Nov. 10, 2026

(54) LIGHT CONTROL DEVICE, SCREEN SYSTEM, LIGHT CONTROL WINDOW, AND LIGHT CONTROL SHEET

(71) Applicant: TOPPAN HOLDINGS INC., Tokyo (JP)

(72) Inventor: Tetsushi Yoshida, Taito-ku (JP)

(73) Assignee: TOPPAN HOLDINGS INC., Tokyo (JP)

( * ) Notice: Subject to any disclaimer, the term of this patent is extended or adjusted under 35 U.S.C. 154(b) by 159 days.

(21) Appl. No.: 18/797,922

(22) Filed: Aug. 8, 2024

(65) Prior Publication Data

US 2024/0402545 A1 Dec. 5, 2024

Related U.S. Application Data

(63) Continuation of application No. PCT/JP2023/004446, filed on Feb. 9, 2023.

(30) Foreign Application Priority Data

Feb. 10, 2022 (JP) ................................ 2022-019987

(51) Int. Cl.
*G02F 1/1334* (2006.01)
*E06B 9/24* (2006.01)
(Continued)

(52) U.S. Cl.
CPC ............ *G02F 1/13439* (2013.01); *E06B 9/24* (2013.01); *G02F 1/13345* (2021.01); *G02F 1/13706* (2021.01); *E06B 2009/2464* (2013.01)

(58) Field of Classification Search
CPC ......... E06B 2009/2464; E06B 2009/24; G02F 1/1334; G02F 1/13345
(Continued)

(56) References Cited

U.S. PATENT DOCUMENTS 5,437,811 A 8/1995 Doane et al.
5,940,150 A 8/1999 Faris et al.
(Continued)

FOREIGN PATENT DOCUMENTS

CN 102053417 A 5/2011
JP 10-177191 A 6/1998
(Continued)

OTHER PUBLICATIONS

International Search Report issued Mar. 20, 2023 in PCT/JP2023/004446, filed Feb. 9, 2023, with English translation, 5 pages.
(Continued)

*Primary Examiner* — Christopher M Raabe
(74) *Attorney, Agent, or Firm* — Oblon, McClelland, Maier & Neustadt, L.L.P.

(57) ABSTRACT

A light control device includes a sheet unit provided with a light control sheet, and a control unit that controls an application of voltage to the sheet unit. The processing executed by the control unit includes setting the light control sheet to a first state in which visible light is reflected by controlling a voltage between transparent electrode layers to a first voltage, setting the light control sheet to a second state in which visible light is scattered by controlling the voltage between the transparent electrode layers to a second voltage, and setting the light control sheet to a third state in which visible light is transmitted by controlling the voltage between the transparent electrode layers to a third voltage.

16 Claims, 5 Drawing Sheets

(51) Int. Cl.
*G02F 1/1343* (2006.01)
*G02F 1/137* (2006.01)

(58) Field of Classification Search
USPC ........................................................... 349/56
See application file for complete search history.

(56) References Cited

U.S. PATENT DOCUMENTS

| | | | | |
|---|---|---|---|---|
| 2011/0058113 | A1* | 3/2011 | Threlkel | G09F 19/22 349/1 |
| 2017/0138120 | A1* | 5/2017 | Suzuka | H10K 59/86 |
| 2018/0373082 | A1* | 12/2018 | Kitamura | E06B 9/24 |
| 2019/0227354 | A1* | 7/2019 | Hayashida | G02F 1/13476 |
| 2020/0298674 | A1* | 9/2020 | Staser | B60J 1/20 |
| 2022/0107522 | A1* | 4/2022 | Popov | G02F 1/13345 |
| 2022/0350188 | A1* | 11/2022 | Kusakabe | G02F 1/1334 |
| 2023/0266629 | A1* | 8/2023 | Morinaga | G02F 1/137 349/16 |
| 2024/0361660 | A1* | 10/2024 | Yoshida | E06B 9/24 |

FOREIGN PATENT DOCUMENTS

| | | |
|---|---|---|
| JP | 2001-513908 A | 9/2001 |
| JP | 2018-045135 A | 3/2018 |

OTHER PUBLICATIONS

Extended European Search Report issued Apr. 24, 2025, in corresponding European Patent Application No. 23752949.0 9 pages.
Japanese Office Action issued Jan. 6, 2026 in Japanese Patent Application No. 2022-019987, 4 pgs.

* cited by examiner

LIGHT CONTROL DEVICE, SCREEN SYSTEM, LIGHT CONTROL WINDOW, AND LIGHT CONTROL SHEET

CROSS-REFERENCE TO RELATED APPLICATIONS

The present application is a continuation of and claims the benefit of priority to International Application No. PCT/JP2023/004446, filed Feb. 9, 2023, which is based upon and claims the benefit of priority to Japanese Application No. 2022-019987, filed Feb. 10, 2022. The entire contents of these applications are incorporated herein by reference.

BACKGROUND OF THE INVENTION

Field of the Invention

The present invention relates to a light control device, a screen system, a light control window, and a light control sheet.

Description of Background Art

JP 2018-45135 A describes a light control sheet includes a light control layer containing a liquid crystal composition, and a pair of transparent electrode layers that sandwich the light control layer, and a drive voltage is applied between the pair of transparent electrode layers. The entire contents of this publication are incorporated herein by reference.

SUMMARY OF THE INVENTION

According to one aspect of the present invention, a light control device includes a light control sheet, and a control unit including circuitry that controls application of a voltage to the light control sheet. The light control sheet includes a first transparent electrode layer, a second transparent electrode layer, and a light control layer positioned between the first transparent electrode layer and the second transparent electrode layer, the light control layer of the light control sheet includes a transparent polymer layer having voids, and a liquid crystal composition including a chiral nematic liquid crystal having positive dielectric anisotropy such that the liquid crystal composition is held in the voids, and the circuitry of the control unit applies a first voltage such that the light control sheet is set to a first state in which visible light is reflected, and applies a third voltage such that the third voltage is greater than the first voltage and that the light control sheet is set to a third state in which the visible light is transmitted.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
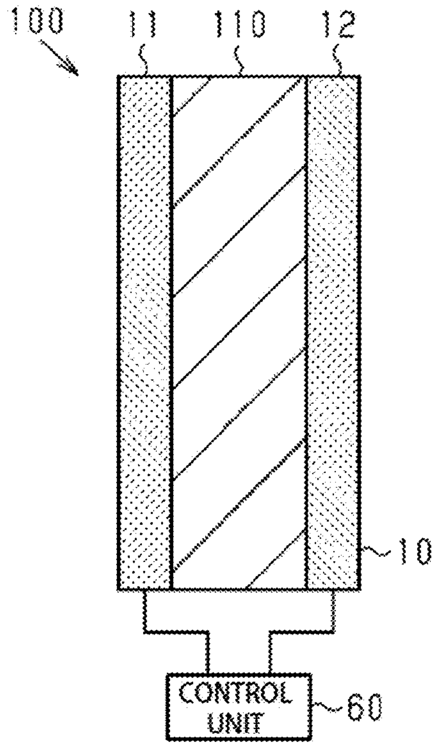
FIG. 1 is a diagram showing a configuration of a light control device according to an embodiment of the present invention.

Embodiments will now be described with reference to the accompanying drawings, wherein like reference numerals designate corresponding or identical elements throughout the various drawings.

An embodiment of a light control device and a light control sheet will be described with reference to FIGS. 1 to 9. In the following description, visible light refers to light in a wavelength range of 360 nm or more and 800 nm or less.

Configuration of Light Control Device

As shown in FIG. 1, the light control device 100 includes a sheet unit 10 and a control unit 60. The sheet unit 10 includes a first light control sheet 11 and a second light control sheet 12. The control unit 60 controls the application of voltage to the light control sheets 11 and 12.

The first light control sheet 11 and the second light control sheet 12 are disposed so as to have an overlap in a thickness direction. The first light control sheet 11 and the second light control sheet 12 may be in contact with each other or may be separated from each other. For example, the first light control sheet 11 may be attached to a front surface of a transparent plate 110, and the second light control sheet 12 may be attached to a rear surface of the transparent plate 110.

The transparent plate 110 is formed of glass, a resin, or the like. The transparent plate 110 may be, for example, window glass provided on various buildings such as houses, stations, and airports, a partition installed in an office, or a display window installed in a store.

The present embodiment is not limited to the modes above, and the first light control sheet 11 and the second light control sheet 12 may be attached to separate transparent plates or may be laminated on a single surface of a single transparent plate.

Configuration of Light Control Sheet

A detailed configuration of the light control sheets 11 and 12 will be described with reference to FIGS. 2 to 5. The first light control sheet 11 will be described below as an example.

Figure 2:
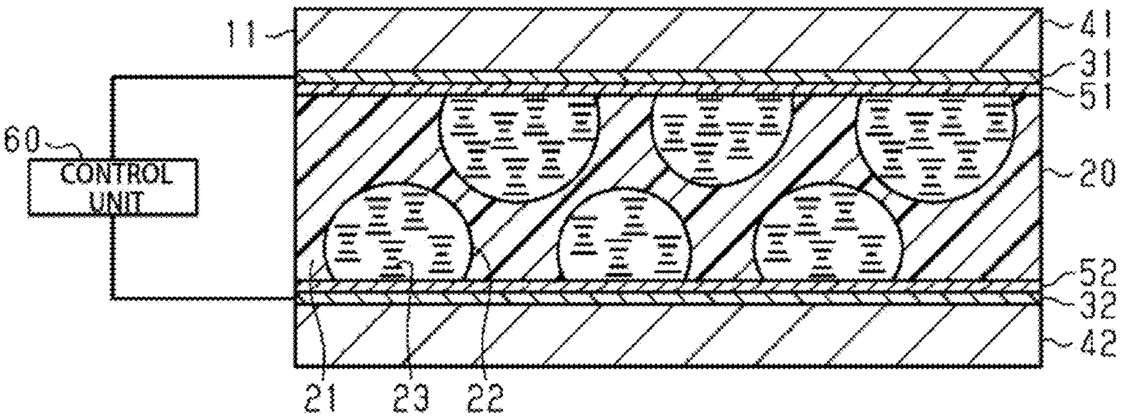
FIG. 2 is a diagram showing a structure of a light control sheet in a first state that is provided in a light control device according to an embodiment of the present invention.

As shown in FIG. 2, the light control sheet 11 includes a light control layer 20, a pair of transparent electrode layers 31 and 32, a pair of transparent support layers 41 and 42, and a pair of alignment layers 51 and 52. The pair of transparent electrode layers 31 and 32 are a first transparent electrode layer 31 and a second transparent electrode layer 32, the pair of transparent support layers 41 and 42 are a first transparent support layer 41 and a second transparent support layer 42, and the pair of alignment layers are a first alignment layer 51 and a second alignment layer 52.

The light control layer 20 is sandwiched between the first transparent electrode layer 31 and the second transparent electrode layer 32. The first alignment layer 51 is positioned between the light control layer 20 and the first transparent electrode layer 31, and the first alignment layer 51 makes contact with the light control layer 20 and the first transparent electrode layer 31. The second alignment layer 52 is positioned between the light control layer 20 and the second transparent electrode layer 32, and the second alignment layer 52 makes contact with the light control layer 20 and the second transparent electrode layer 32. The first transparent support layer 41 supports the first transparent electrode layer 31 on the opposite side of the first transparent electrode layer 31 to the light control layer 20, and the second transparent support layer 42 supports the second transparent electrode layer 32 on the opposite side of the second transparent electrode layer 32 to the light control layer 20.

The light control layer 20 includes a transparent polymer layer 21 and a liquid crystal composition, being a chiral nematic liquid crystal. The liquid crystal composition contains liquid crystal molecules 23. The transparent polymer layer 21 separates voids 22, and the liquid crystal composition is held inside the voids 22. The liquid crystal composition has a positive dielectric anisotropy. That is, the dielectric constant of the liquid crystal molecules 23 in a long axis direction is larger than the dielectric constant of the liquid crystal molecules 23 in a short axis direction.

Examples of these liquid crystal molecules 23 include liquid crystal molecules based on Schiff bases, and azo-based, azoxy-based, biphenyl-based, terphenyl-based, benzoic acid ester-based, tolan-based, pyrimidine-based, cyclohexanecarboxylic acid ester-based, phenylcyclohexane-based, and dioxane-based liquid crystal molecules. Furthermore, examples of the chiral agent included in the liquid crystal composition include optically active, low-molecular weight compounds having one or more asymmetric carbon atoms.

The structure of the transparent polymer layer 21 and the type of retaining structure for the liquid crystal composition may be, for example, a polymer network-type, a polymer dispersion-type, or a capsule-type. A polymer network-type light control layer 20 includes a polymer network having a three-dimensional mesh shape. A polymer network is an example of a transparent polymer layer, which holds the liquid crystal composition in voids that communicate with each other within the mesh of the polymer network. A polymer dispersion-type light control layer 20 includes a transparent polymer layer that divides a large number of isolated voids and holds the liquid crystal composition inside the voids dispersed in the transparent polymer layer. A capsule-type light control layer 20 holds the liquid crystal composition in the voids inside capsules dispersed in the transparent polymer layer.

Each of the first transparent electrode layer 31 and the second transparent electrode layer 32 is formed of a material having conductivity and is transparent to visible light. A known material may be used as the material of the transparent electrode layers 31 and 32. For example, the material of the transparent electrode layers 31 and 32 may be indium tin oxide, fluorine-doped tin oxide, tin oxide, zinc oxide, carbon nanotubes, poly(3,4-ethylenedioxythiophene), silver, or a silver alloy.

Each of the first transparent support layer 41 and the second transparent support layer 42 is a base material that is transparent to visible light. A known material may be used as the material of the transparent support layers 41 and 42. The material of the transparent support layers 41 and 42 may be a synthetic resin or an inorganic compound. The synthetic resin may be, for example, a polyester, a polyacrylate, a polycarbonate, or a polyolefin. Examples of the polyester include polyethylene terephthalate and polyethylene naphthalate. Examples of the polyacrylate include polymethyl methacrylate. Examples of the inorganic compound include silicon dioxide, silicon oxynitride, and silicon nitride.

Each of the first alignment layer 51 and the second alignment layer 52 is a horizontal alignment film. The horizontal alignment film aligns the liquid crystal molecules 23 such that the long axis direction of the liquid crystal molecules 23 is horizontally aligned with the surface of the alignment film. The material of the alignment layers 51 and 52 is an organic compound, an inorganic compound, or a mixture of these compounds. Examples of the organic compound include polyimides, polyamides, polyvinyl alcohols, and cyanide compounds. Examples of the inorganic compound include silicon oxide and zirconium oxide. The material of the alignment layers 51 and 52 may be silicone. A silicone is a compound that has an inorganic part and an organic part.

The control unit 60 is connected to each of the first transparent electrode layer 31 and the second transparent electrode layer 32 via wiring. The control unit 60 generates a voltage for driving the light control sheet 11 and applies the generated voltage to the transparent electrode layers 31 and 32 through the wiring. The control unit 60 controls the magnitude of the voltage between the transparent electrode layers 31 and 32 by controlling the presence or absence of the applied voltage, and by controlling the magnitude of the applied voltage.

The control unit 60 controls the voltage between the transparent electrode layers 31 and 32 to one of a first voltage V1, a second voltage V2, and a third voltage V3. The first voltage V1 is 0 V, the second voltage V2 is greater than the first voltage V1, and the third voltage V3 is greater than the second voltage V2.

FIG. 2 schematically shows the light control sheet 11 in a first state. In the first state, the voltage between the transparent electrode layers 31 and 32 is controlled to the first voltage V1, and the liquid crystal composition exhibits a planar state. That is, many of the liquid crystal molecules 23 contained in the light control layer 20 are aligned such that the long axis direction of the liquid crystal molecules 23 is along a direction that is substantially parallel to the alignment layers 51 and 52 and the transparent electrode layers 31 and 32, and a helical axis of the liquid crystal composition, which has a helical structure, extends in a direction that is substantially perpendicular to the alignment layers 51 and 52 and the transparent electrode layers 31 and 32.

When the liquid crystal composition, which is a chiral nematic liquid crystal, is in a planar state, the liquid crystal composition selectively reflects light in a certain wavelength range. In the present embodiment, the liquid crystal composition selectively reflects visible light as a result of a helical pitch P (m), an ordinary refractive index no, and an extraordinary refractive index ne of the liquid crystal composition satisfying equation (1) below.

$$0.4 \leqq P\times(ne+2no)/3 \leqq 0.8 \quad (1)$$

As a result, in the first state, the light control layer 20 selectively reflects visible light that enters from the front surface or rear surface of the light control sheet 11 toward the light control layer 20. Each of the helical pitch P, the ordinary refractive index no, and the extraordinary refractive index ne of the liquid crystal composition can be adjusted by the type of liquid crystal molecules 23, the type of chiral agent, the addition amount of the chiral agent, and the like.

In the equation (1) above, "P×(ne+2no)/3" is an equation that defines the reflection wavelength of the liquid crystal composition. The logic used in deriving the equation will be described below.

The reflection wavelength of the liquid crystal composition, which is a chiral nematic liquid crystal, is expressed by the product of the helical pitch P and the refractive index n of the liquid crystal composition. As the refractive index n, it is most convenient to use the ordinary refractive index no. On the other hand, in consideration of the fact that the liquid crystal molecules have birefringence, that it is possible to assume that the helical axis of the liquid crystal composition of the light control sheet 11 in the first state is perpendicular to the light control sheet 11, and that when light enters the light control sheet 11 from the outside of the light control sheet 11, the propagation direction of the light is substantially the same as the orientation of the helical axis, the use of an average value of the ordinary refractive index no and the extraordinary refractive index ne as the refractive index n can also be considered.

For a case where the ordinary refractive index no is used as the refractive index n, and for a case where an average value of the ordinary refractive index no and the extraordinary refractive index ne is used, the calculated value of the reflection wavelength, and the measured value of the reflection wavelength of the light control sheet 11 are compared. As a result, it was confirmed that a deviation occurred between a peak median value of the measured value, that is, a median value of the peak width of a peak having a width, and the calculated value of the reflection wavelength.

Here, the possibility that a tilt has occurred in the helical axis is focused. In this case, the effective refractive index of the liquid crystal composition with respect to the incident light is closer to the ordinary refractive index no than the average value of the ordinary refractive index no and the extraordinary refractive index ne. As a result, the equation "P×(ne+2no)/3" above is derived by applying more weight to the ordinary refractive index no to obtain a weighted average of the ordinary refractive index no and the extraordinary refractive index ne, and then using the value as the refractive index n. Further, it is confirmed that the calculated value of the reflected wavelength using this equation matched the peak median value of the measured value of the reflection wavelength of the light control sheet 11. This suggested that the apparent helical pitch P changes depending on the tilt of the helical axis, and variations in the helical pitch P and the change in the helical pitch P described above are factors that produce a width in the peak of the measured value of the reflection wavelength.

As described above, it is shown that, as a result of focusing on the tilt of the helical axis in addition to the birefringence of the liquid crystal molecules, and by using an equation in which more weight is applied to the ordinary refractive index no, it is possible to accurately calculate the reflection wavelength of the liquid crystal composition in the planar state.

As a result of using a liquid crystal composition that satisfies equation (1) above in the light control layer 20, light having a wavelength in the visible region is precisely reflected by the light control sheet 11 in the first state. More specifically, from the visible light that has entered the light control layer 20, a circularly polarized light component rotating in the same direction as the twisting direction of the helical axis of the liquid crystal composition is reflected, and the other components are transmitted through the light control layer 20.

In order to increase the reflectance to visible light, in the first state, it is preferable that the liquid crystal molecules 23 have a horizontal alignment, that is, the liquid crystal molecules 23 are aligned substantially parallel to the alignment layers 51 and 52 and the transparent electrode layers 31, 32 in a region representing 50% or more of the light control layer 20. Further, it is preferable that the proportion of the transparent polymer layer 21 in the light control layer 20 is less than 50%. For example, if the proportion of the horizontally aligned region near the surface of the light control layer 20 is 50% or more in an image observed with a polarizing microscope, it can be determined that the proportion of the horizontally aligned region in the entire light control layer 20 is 50% or more.

On the other hand, in order to precisely form the retaining structure for the liquid crystal composition in the transparent polymer layer 21, the proportion of the transparent polymer layer 21 in the light control layer 20 is preferably 10% or more, and more preferably 20% or more. Further, the proportion of the liquid crystal composition in the light control layer 20 is preferably 50% or more and 90% or less, and more preferably 60% or more and 80% or less. Therefore, in order to preferably form the retaining structure for the liquid crystal composition while also increasing the reflectance to visible light, in the first state, the region in which the liquid crystal molecules 23 have a horizontal alignment is preferably 50% or more and 90% or less, and more preferably 60% or more and 80% or less of the light control layer 20.

Figure 3:
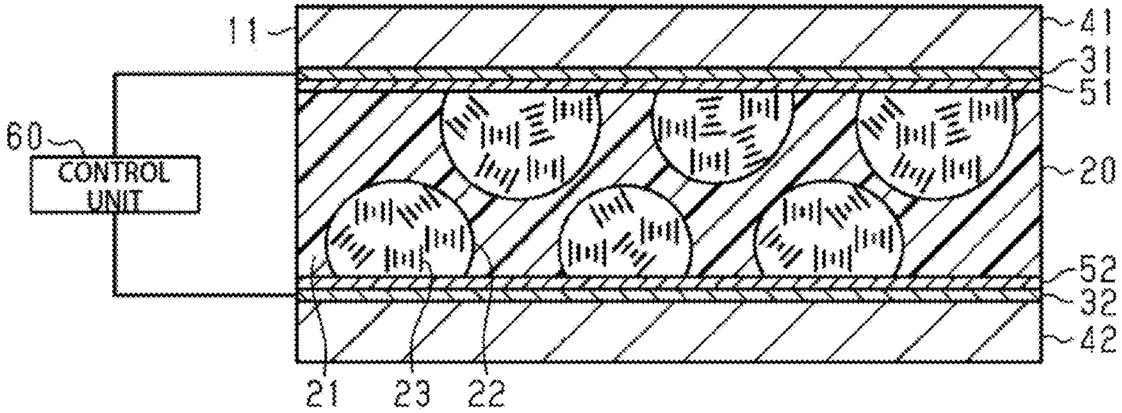
FIG. 3 is a diagram showing a structure of a light control sheet in a second state that is provided in a light control device according to an embodiment of the present invention.

FIG. 3 schematically shows the light control sheet 11 in a second state. In the second state, the voltage between the transparent electrode layers 31 and 32 is controlled to the second voltage V1, and the liquid crystal composition exhibits a focal conic state. That is, the helical axis of the liquid crystal composition extends in a direction that is different from a direction perpendicular to the alignment layers 51 and 52 and the transparent electrode layers 31 and 32, such as a direction that is parallel to the layers.

When the liquid crystal composition is in a focal conic state, because the angle between the incident direction of the light into the light control sheet 11 and the long axis direction of the liquid crystal molecules 23 is not constant and is dispersed in the light control layer 20, the light propagates while being reflected in various directions. That is, in the second state, the visible light that enters the light control sheet 11 is scattered.

Figure 4:
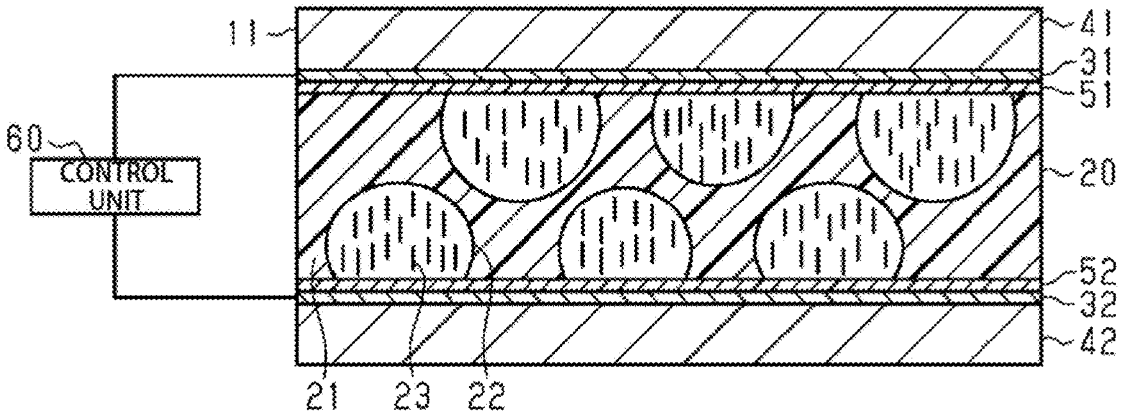
FIG. 4 is a diagram showing a structure of a light control sheet in a third state that is provided in a light control device according to an embodiment of the present invention.

FIG. 4 schematically shows the light control sheet 11 in a third state. In the third state, the voltage between the transparent electrode layers 31 and 32 is controlled to the third voltage V3, and the liquid crystal composition exhibits a homeotropic state. That is, the helical structure of the liquid crystal composition is unraveled, and the liquid crystal molecules 23 are aligned along the direction of the electric field between the transparent electrode layers 31 and 32. In other words, the liquid crystal molecules 23 are positioned such that the long axis direction of the liquid crystal molecules 23 is along a direction perpendicular to the alignment layers 51 and 52 and the transparent electrode layers 31 and 32.

In this way, the third voltage V3 is a voltage having a magnitude that causes the liquid crystal composition to align in a homeotropic state. The liquid crystal composition exhibits a homeotropic state when a voltage greater than or equal to a predetermined value that depends on the composition is applied. The third voltage V3 is a voltage greater than or equal to the predetermined value. Further, the second voltage V2 that is applied in the second state described above is a voltage greater than 0V and less than the predetermined value.

When the liquid crystal composition is in a homeotropic state, visible light is transmitted through the light control layer 20. In order to suppress bending in the propagation direction of the visible light in the light control layer 20, it is preferable that the refractive index np of the polymer material constituting the transparent polymer layer 21 substantially matches the ordinary refractive index no of the liquid crystal composition. Specifically, it is preferable that the refractive index np of the polymer material and the ordinary refractive index no of the liquid crystal composition with respect to a wavelength in the visible region satisfy equation (2) below. The wavelength in the visible region mentioned above may be, for example, the reflection wavelength of the liquid crystal composition obtained by the equation "P×(ne+2no)/3" that defines the reflection wavelength.

$$0.98 \leq np/no \leq 1.02 \qquad (2)$$

Figure 5:
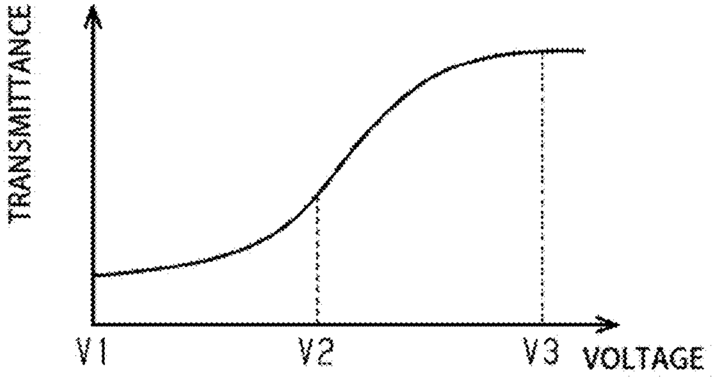
FIG. 5 is a diagram showing a typical example of the relationship between an applied voltage and a visible light transmittance of a light control sheet that is provided in a light control device according to an embodiment of the present invention.

FIG. 5 shows a typical example of the relationship between the voltage between the transparent electrode layers 31 and 32 and the transmittance to visible light by the light control sheet 11 when the light control sheet 11 changes from the first state to the third state via the second state. As shown in FIG. 5, as the voltage increases from the first voltage V1 to the third voltage V3, the transmittance to visible light increases monotonically. Here, the change in transmittance is gradual near the first voltage V1 and near the third voltage V3. On the other hand, the transmittance changes rapidly near the second voltage V2.

As mentioned above, in the first state, in which the voltage between the transparent electrode layers 31 and 32 is the first voltage V1, the reflection to visible light by the light control layer 20 becomes greater, and the transmission of visible light becomes less. On the other hand, in the third state, in which the voltage between the transparent electrode layers 31 and 32 is the third voltage V3, the transmission of visible light becomes greater. Further, in the second state, in which the voltage between the transparent electrode layer 31 and 32 is the second voltage V2, because scattering of visible light occurs, the transmission of visible light becomes greater than the in first state, and less than in the third state. As a result, the transmittance to visible light by the light control sheet 11 exhibits the change shown in FIG. 5 according to the change in the voltage between the transparent electrode layers 31 and 32.

Here, the change from the first state to the second state, and the change from the second state to the third state are changes that are only possible in one direction. That is, when the light control sheet 11 is in the first state, and the voltage between the transparent electrode layers 31 and 32 is changed from the first voltage V1 to the second voltage V2, the light control sheet 11 changes from the first state to the second state. On the other hand, when the light control sheet 11 is in the second state, and the voltage between the transparent electrode layers 31 and 32 is changed from the second voltage V2 to the first voltage V1, a change from the second state to the first state does not occur, and the liquid crystal composition maintains a focal conic state.

Similarly, when the light control sheet 11 is in the second state, and the voltage between the transparent electrode layers 31 and 32 is changed to the third voltage V3, the light control sheet 11 changes from the second state to the third state. On the other hand, when the light control sheet 11 is in the third state, and the voltage between the transparent electrode layers 31 and 32 is changed from the third voltage V3 to the second voltage V2, a change from the third state to the second state does not occur, and the liquid crystal composition maintains a homeotropic state.

In contrast, a change from the first state to the third state is possible in both directions. That is, when the light control sheet 11 is in the first state, and the voltage between the transparent electrode layers 31 and 32 is changed from the first voltage V1 to the third voltage V3, the light control sheet 11 changes from the first state to the third state. Furthermore, when the light control sheet 11 is in the third state, and the voltage between the transparent electrode layers 31 and 32 is changed from the third voltage V3 to the first voltage V1, the light control sheet 11 changes from the third state to the first state.

The second light control sheet 12 has the same configuration as the first light control sheet 11, except for the optical rotation of the liquid crystal composition. That is, the optical rotation of the liquid crystal composition of the light control layer 20 provided in the first light control sheet 11 and the optical rotation of the liquid crystal composition of the light control layer 20 provided in the second light control sheet 12 are different from each other. For example, the liquid crystal composition of the first light control sheet 11 exhibits dextrorotation, and the liquid crystal composition of the second light control sheet 12 exhibits levorotation. In the first light control sheet 11 and the second light control sheet 12, by changing the optical rotation of the chiral agent contained in the liquid crystal composition, it is possible to change the optical rotation of the liquid crystal composition.

The set value of the reflection wavelength of the first light control sheet 11 and the set value of the reflection wavelength of the second light control sheet 12 are preferably the same. The set value of the reflection wavelength is the value calculated by the equation "P×(ne+2no)/3" that defines the reflection wavelength. In other words, it is preferable that the peak wavelength of the reflected light of the first light control sheet 11 in the first state is the same as the peak wavelength of the reflected light of the second light control sheet 12 in the first state.

The control unit 60 may control the voltage applied to the first light control sheet 11 and the voltage applied to the second light control sheet 12 such that the voltages are linked to each other, or may independently control the voltage for each of the light control sheets 11 and 12. The processing executed by the control unit 60 includes setting each of the first light control sheet 11 and the second light control sheet 12 to the first state, setting each of the first light control sheet 11 and the second light control sheet 12 to the second state, and setting each of the first light control sheet 11 and the second light control sheet 12 to the third state.

Application Examples

Screen System

A mode in which the light control device 100 is applied to a screen system will be described as a first application example of the light control device 100.

Figure 6:
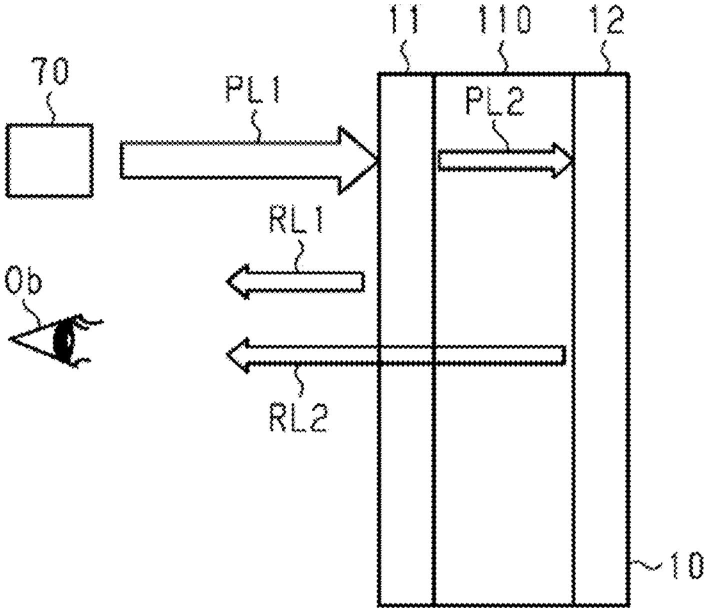
FIG. 6 is a diagram showing a usage mode of a screen system to which a light control device according to an embodiment of the present invention has been applied, in which a sheet unit is in a first state.

The operation of a screen system including the light control device 100 will be described with reference to FIGS. 6 to 8. The screen system includes a screen including the sheet unit 10, and the control unit 60. FIG. 6 shows a state where both the first light control sheet 11 and the second light control sheet 12 are in the first state, or in other words, a state where the sheet unit 10 is in the first state. At this time, the screen system is used in a reflection-type projection system.

A projection device 70 and an observer Ob are positioned in one of the two spaces sandwiching the sheet unit 10. In the example of FIG. 6, the projection device 70 and the observer Ob are positioned in a first space, which is a space facing the first light control sheet 11. The projection device 70 may be, for example, a projector, and a projection light PL1 corresponding to image data to be projected is emitted toward the sheet unit 10. The projection device 70 may be a portion of the screen system, and the driving of the projection device 70 may also be controlled by the control unit 60.

When the projection light PL1 enters the first light control sheet 11, a portion of the light RL1 of the projection light PL1 is reflected at the first light control sheet 11. Further, the remaining light PL2 is transmitted through the first light control sheet 11 and enters the second light control sheet 12, and the light RL2 is reflected at the second light control sheet 12. The light RL2 is transmitted through the first light control sheet 11 and emerges into the first space in which the observer Ob is positioned. The light RL1 and the light RL2 are circularly polarized light components rotating in mutually different directions. For example, when the liquid crystal composition of the first light control sheet 11 exhibits dextrorotation and the liquid crystal composition of the second light control sheet 12 exhibits levorotation, the light RL1 is a right circularly polarized component, and the light RL2 is a left circularly polarized light component. The observer Ob observes the light RL1 and the light RL2. As a result, the projected image is observed by the observer Ob.

In this way, as a result of circularly polarized components that are different from each other being reflected by the first light control sheet 11 and the second light control sheet 12, a large portion of the projection light PL1 is reflected by the sheet unit 10. Therefore, because the intensity of the reflected light is high, the brightness of the image that is observed by the observer Ob can be increased. Furthermore, because leakage of a portion of the projection light PL1 to the space on the opposite side to the projection device 70 and the observer Ob with respect to the sheet unit 10 can be suppressed, leakage of unnecessary light into the space on the rear of the sheet unit 10 can be suppressed.

For example, as a result of laminating a reflective layer on a conventional light control sheet that can be switched between a scattering state and a transparent state, it is possible to use the light control sheet in the scattering state as a screen of a reflection-type projection system. However, in order to allow the scene behind the light control sheet to be visible in the transparent state, a film that has a certain degree of light transmittance, such as a half mirror film, is used as the reflective layer, and as a result, there is a limit to how much the reflectivity of the reflective layer can be increased. Therefore, there is a limit to how much the strength of the reflected light can be increased, that is, how much the brightness of the image can be increased, and further, because the reflective layer has light transmittance, it is also difficult to suppress leakage of light into the space on the rear of the screen.

In contrast, if the sheet unit 10 of the present embodiment is used as a screen, as mentioned above, because a large portion of the projection light is reflected by the two light control sheets 11 and 12 in the first state, it is possible to increase the brightness of the image, and further, it is also possible to suppress leakage of light into the space on the rear of the screen.

It is possible to similarly project an image from the side on which the second light control sheet 12 is positioned. That is, it is possible for the projection device 70 and the observer Ob to be positioned in the second space, which is the space facing the second light control sheet 12, and for the observer Ob to observe the image that is projected from the projection device 70 onto the sheet unit 10. Further, it is also possible for images that are different from each other to be projected in each of the first space and the second space.

For example, the screen system may include projection devices 70 that are respectively disposed in the first space and the second space. In the first space, a first projection device 70 projects a first image toward the first light control sheet 11, and in the second space, a second projection device 70 projects a second image toward the second light control sheet 12. The first image and the second image can be images that are different to each other, and the projection of the images may be performed simultaneously. According to such a configuration, because it is possible to project images in two spaces using the sheet unit 10, which is a single screen, the facilities can be simplified, and the space can be more efficiently used.

Figure 7:
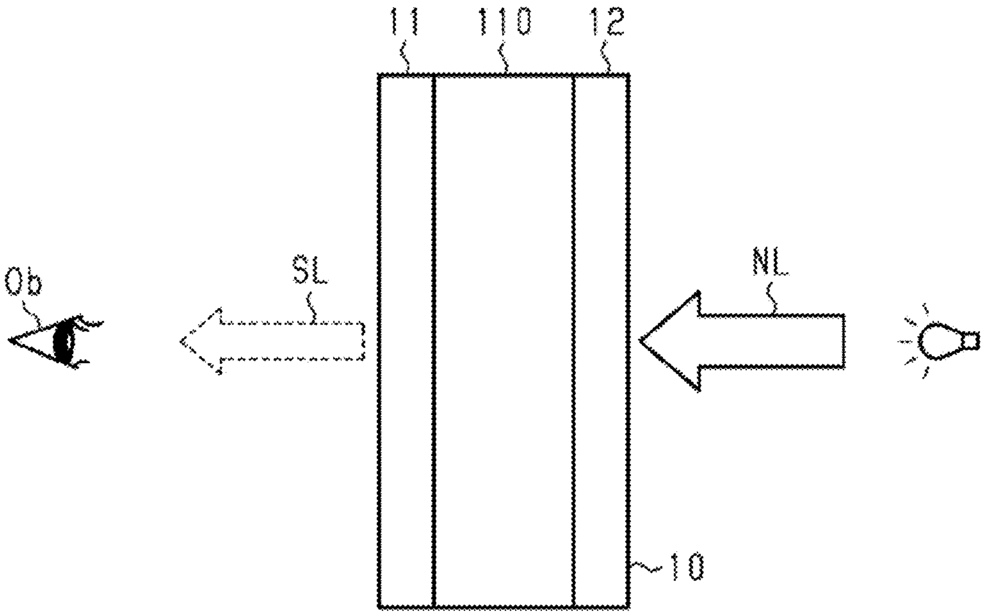
FIG. 7 is a diagram showing a usage mode of a screen system to which a light control device according to an embodiment of the present invention has been applied, in which a sheet unit is in a second state.

FIG. 7 shows a state where both the first light control sheet 11 and the second light control sheet 12 are in the second state, or in other words, a state where the sheet unit 10 is in the second state. In this case, when external light NL, which is illumination light or sunlight, enters the light control sheets 11 and 12, light scattering occurs, and scattered light SL emerges from the light control sheets 11 and 12. The observer Ob observes the scattered light SL. As a result, the light control sheets 11 and 12 appear cloudy, and the scene behind the sheet unit 10 is not clearly visible. In this case, it is possible to prevent the observer Ob and the surroundings from being observed from the outside via the sheet unit 10.

In order to lower the transparency of each of the light control sheets 11 and 12 in the second state, that is, in order to increase the haze of the light control sheets 11 and 12, it is preferable to use a liquid crystal composition with a large refractive index anisotropy Δn. However, for example, tolan-based liquid crystal molecules having a large refractive index anisotropy Δn cannot be said to have high versatility, and when such liquid crystal molecules are used, the reliability of the light control layer 20 tends to decrease. In contrast, in the sheet unit 10 of the present embodiment, because the first light control sheet 11 and the second light control sheet 12 are overlapped, it is possible to lower the transparency of the sheet unit 10 even when the haze of each of the light control sheets 11 and 12 is low.

Therefore, when a liquid crystal composition with a low refractive index anisotropy Δn is used, or more specifically, when a liquid crystal composition containing liquid crystal molecules whose refractive index anisotropy Δn is 0.16 or less is used, it is possible to keep the transparency of the sheet unit 10 low in the second state, and to increase the reliability of the light control sheets 11 and 12.

Figure 8:
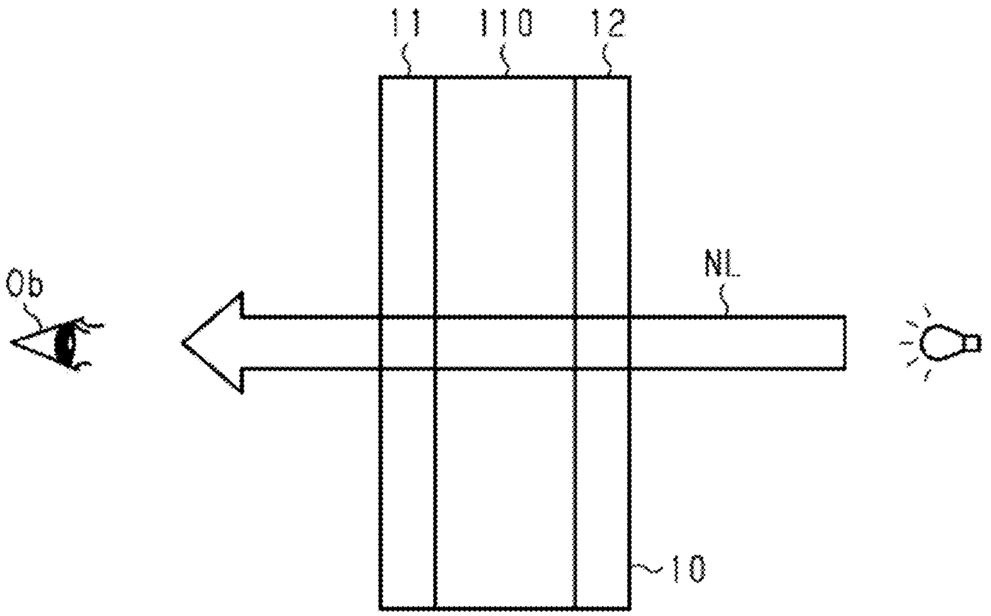
FIG. 8 is a diagram showing a usage mode of a screen system to which a light control device according to an embodiment of the present invention has been applied, in which a sheet unit is in a third state.

FIG. 8 shows a state where both the first light control sheet 11 and the second light control sheet 12 are in the third state, or in other words, a state where the sheet unit 10 is in the third state. In this case, external light NL, which is illumination light or sunlight, is transmitted through the light control sheets 11 and 12. Therefore, the light control sheets 11 and 12 are transparent, and the observer Ob is capable of observing the scene behind the sheet unit 10.

As mentioned above, when a reflective layer is superimposed on a conventional light control sheet that can be switched between a scattering state and a transparent state and is used as a screen, the light transmittance of the light control sheet in the transparent state becomes low compared to a case where the reflective layer is not provided. In contrast, in the case of the sheet unit 10 of the present embodiment, the first state in which visible light can be reflected can be realized without using a reflective layer, which enables a high light transmittance to be obtained in the transparent third state.

As described above, according to the first application example, by using the selective reflection of a chiral nematic liquid crystal, it is possible to use the sheet unit 10 including the light control sheets 11 and 12 as a screen in a reflection-type projection system. Further, by switching between the first state, the second state, and the third state, it is possible to switch the sheet unit 10 between a state in which an image can be projected, a cloudy state, and a transparent state. Therefore, the degree of freedom is increased in terms of the where the sheet unit 10 is positioned, how the space in which the sheet unit 10 is positioned is used, and the like.

Even if the applied voltage is set to 0 V after switching the sheet unit 10 to the second state, a visible light scattering function is maintained in the same manner as in the second state. Therefore, it is possible to maintain a state in which the transparency of the sheet unit 10 is low, while also reducing the power consumption.

Light Control Window

A mode in which the light control device 100 is applied to a light control window will be described as a second application example of the light control device 100.

Figure 9:
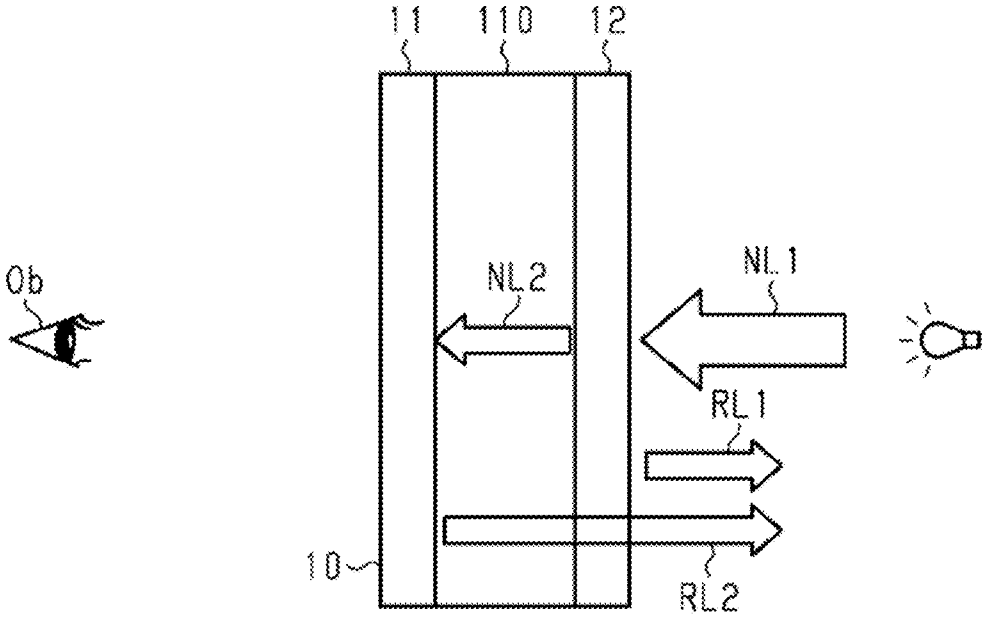
FIG. 9 is a diagram showing a usage mode of a light control window to which a light control device according to an embodiment of the present invention has been applied, in which a sheet unit is in the first state.

The operation of a light control window including the light control device 100 will be described with reference to FIG. 9. The light control window includes a window to which the sheet unit 10 has been attached, and a control unit 60. FIG. 9 shows a state where both the first light control sheet 11 and the second light control sheet 12 are in the first state, or in other words, a state where the sheet unit 10 is in the first state. In the example of FIG. 9, the observer Ob is positioned in the first space, which is the space facing the first light control sheet 11.

When external light NL1, which is illumination light or sunlight, enters the second light control sheet 12 from the second space, which is on the opposite side to the first space with respect to the sheet unit 10, a portion of the light RL1 of the external light NL1 is reflected at the second light control sheet 12. Further, the remaining light NL2 is transmitted through the second light control sheet 12 and enters the first light control sheet 11, and the light RL2 is reflected at the first light control sheet 11. The light RL1 and the light RL2 are circularly polarized light components rotating in mutually different directions. For example, when the liquid crystal composition of the second light control sheet 12 exhibits levorotation and the liquid crystal composition of the first light control sheet 11 exhibits dextrorotation, the light RL1 is a left circularly polarized component, and the light RL2 is a right circularly polarized light component.

In this way, as a result of circularly polarized components that are different from each other being reflected by the first light control sheet 11 and the second light control sheet 12, a large portion of the external light NL1 is reflected by the sheet unit 10. Therefore, external light is prevented from entering the first space where the observer Ob is present. In other words, the sheet unit 10 is capable of blocking light.

When the two light control sheets 11 and 12 are both in the second state, and when the two light control sheets 11 and 12 are both in the third state, this is equivalent to the first application example described using FIGS. 7 and 8.

As described above, according to the second application example, by switching between the first state, the second state, and the third state, it is possible to switch the sheet unit 10 between a light blocking state, a cloudy state, and a transparent state. Therefore, it becomes possible to switch the effects that the sheet unit 10 brings to a space in a more diverse manner.

Like the first application example, even if the applied voltage is set to 0 V after switching the sheet unit 10 to the second state, a visible light scattering function is maintained in the same manner as in the second state. Therefore, it is possible to maintain a state in which the transparency of the sheet unit 10 is low, while also reducing the power consumption.

Furthermore, in both the first application example and the second application example, the control unit 60 may separately control the voltage applied to the first light control sheet 11 and the second light control sheet 12, and control the state of each of the light control sheets 11 and 12 such that the first light control sheet 11 and the second light control sheet 12 are set to separate states among the first state, the second state, and the third state. As a result, it is possible to more finely switch the degree of reflection, transmission, and scattering of visible light in the sheet unit 10.

According to the embodiment described above, the following effects can be obtained.

(1) As a result of switching the application voltage to the sheet unit 10, switching is possible between the first state, in which the sheet unit 10 reflects visible light, the second state, in which the sheet unit 10 scatters visible light, and the third state, in which the sheet unit 10 transmits visible light. As a result, because it is possible to switch an optical characteristic that is different from switching between the transmission state and the scattering state, it is possible to use the light control sheet in new applications such as a screen system used in a reflection-type projection system and a light control window that is capable of blocking light.

(2) Because it is possible to realize the first state, in which visible light is reflected, without using a reflective layer such as a half mirror film, it is possible to obtain a high light transmittance in the third state.

(3) The sheet unit 10 includes the two light control sheets 11 and 12 having different optical rotation from each other, and the light control sheets 11 and 12 are positioned so as to have an overlap in the thickness direction. As a result, by setting the two light control sheets 11 and 12 to the first state, because circularly polarized components that are different from each other are reflected, more components of the light that is irradiated onto the sheet unit 10 are reflected. Therefore, the intensity of the reflected light can be increased, and the transmission of light through the sheet unit 10 can be further suppressed.

Consequently, the screen system can project a brighter image, and is also capable of suppressing leakage of light into the space on the rear of the screen. Furthermore, the light control window is capable of enhancing the light blocking characteristics.

(4) The helical pitch P, the ordinary refractive index no, and the extraordinary refractive index ne of the liquid crystal composition in the light control sheets 11 and 12 satisfy equation (1) below. As a result, the reflection wavelength of the liquid crystal composition, which is a chiral nematic liquid crystal, is accurately set in the visible region.

$$0.4 \leqq P \times (ne + 2no)/3 \leqq 0.8 \quad (1)$$

(5) In the light control sheets 11 and 12 in the first state, the proportion of the region in the light control layer 20 in which the liquid crystal molecules 23 included in the liquid crystal composition have a horizontal alignment is 50% or more. As a result, good reflectance can be obtained for visible light.

(6) The proportion of the transparent polymer layer 21 in the light control layer 20 is less than 50%. As a result, the proportion of the liquid crystal composition in the light control layer 20 can be sufficiently ensured, and good reflectance to visible light can be obtained in the first state.

(7) The refractive index np of the polymer material and the ordinary refractive index no of the liquid crystal composition constituting the transparent polymer layer 21 satisfy equation (2) below. As a result, in the third state, because visible light more easily propagates inside the light control layer 20, the transmittance to visible light can be increased.

$$0.98 \leqq np/no \leqq 1.02 \quad (2)$$

(8) The light control sheets 11 and 12 include the alignment layers 51 and 52. As a result, the proportion of the liquid crystal molecules 23 having a horizontal alignment in the first state can be increased. Therefore, the reflectance to visible light in the first state can be increased.

(9) In the mode in which the light control device 100 is applied to a screen system, it is possible to switch between the state in which the sheet unit 10 is capable of projecting an image in a reflection-type projection system, the cloudy state, and the transparent state. In this way, the sheet unit 10 can be used as a screen of a reflection-type projection system.

(10) The screen system includes the first projection device that irradiates light toward the first light control sheet 11, and the second projection device that irradiates light toward the second light control sheet 12 from the opposite side to the first projection device with respect to the sheet unit 10, which is a screen. According to such a configuration, it is possible to use the sheet unit 10, which is a single screen, to project images in each of the two spaces sandwiching the sheet unit 10. Therefore, the facilities can be simplified, while also allowing the space to be efficiently used.

(11) In the mode in which the light control device 100 is applied to a light control window, it is possible to switch the sheet unit 10 between the light blocking state, the cloudy state, and the transparent state. Therefore, a light control window that can be switched between the light blocking state and other states can be realized.

Example

A specific example of the light control device and the light control sheet above will be described.

Preparation of Sheet Unit

The first light control sheet including a light control layer, a pair of transparent electrode layers, a pair of transparent support layers, and a pair of alignment layers was formed. The material of the transparent electrode layers was indium tin oxide, the material of the transparent support layers was polyethylene terephthalate, and the material of the alignment layers was polyimide. The light control layer was a polymer network-type layer that was formed such that the parameters were as follows.

- Dielectric anisotropy $\Delta\varepsilon$ of liquid crystal composition: 10.9
- Ordinary refractive index no of liquid crystal composition: 1.51
- Extraordinary refractive index ne of liquid crystal composition: 1.68
- Refractive index np of polymer material constituting transparent polymer layers: 1.50
- Helical pitch P of liquid crystal composition: 0.33 μm
- Set value of reflection wavelength (P×(ne+2no)/3): 0.52 μm
- Proportion of transparent polymer layer in light control layer: 12.6%
- Optical rotation of chiral agent: dextrorotation Except for using a levorotatory chiral agent, the second light control sheet was formed using the same materials as the first light control sheet. That is, except for the optical rotation of the chiral agent, the parameters of the light control layer in the second light control sheet were the same as those of the first light control sheet.

Analysis of Reflection Characteristics

The wavelength range and the reflectance of the reflected light was measured for the two light control sheets of the Example when the applied voltage was 0 V. When the applied voltage is 0 V, the light control sheet is in the first state. The measurement results are shown in FIG. 10.

Figure 10:
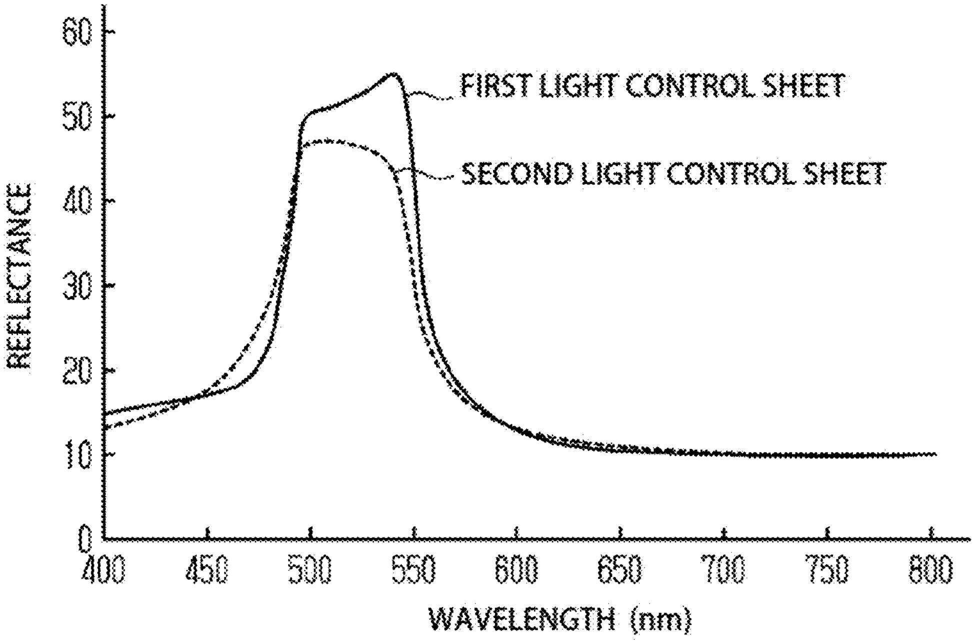
FIG. 10 is a diagram showing the reflection characteristics of two light control sheets provided in a sheet unit of an Example.

As shown in FIG. 10, when the applied voltage was 0 V, a reflection having a peak near 520 nm was obtained in each of the two light control sheets. The peak wavelength of the reflected light approximately matched the set value of the reflection wavelength mentioned above. The peak half width was 70 nm to 80 nm, and the reflectance near the peak wavelength was approximately 50%.

As a result of the above, it was confirmed that selective reflection of visible light is possible using the light control sheets of the Example. Therefore, it is possible to use the light control sheets in a screen of a reflection-type projection system, or to realize the light blocking state of a light control window using the light control sheets.

Modifications

The above embodiment can be implemented with modifications as described below. The following modifications may be implemented by being combined.

The light control sheet does not have to include the alignment layers 51 and 52. When the alignment layers 51 and 52 are not provided, compared to the embodiment described above, the proportion of the liquid crystal molecules 23 having a horizontal alignment in the first state becomes smaller. On the other hand, good reflectance to visible light can be obtained as long as the liquid crystal molecules 23 have a horizontal alignment in a region that is 50% or more of the light control layer 20. Even when the alignment layers 51 and 52 are not provided, if a chiral nematic liquid crystal is used, it is possible for the liquid crystal molecules 23 to have a horizontal alignment in a region that is 50% or more when a voltage is not applied. When it is not necessary to form the alignment layers, it is possible to simplify the manufacturing process of the light control sheet and to reduce the manufacturing cost.

The peak wavelength of the reflected light of the first light control sheet 11 in the first state may be different from the peak wavelength of the reflected light of the second light control sheet 12 in the first state. When the peak wavelengths of the reflected light of the two light control sheets 11 and 12 are different, because light in the wavelength ranges near the respective peak wavelengths is reflected, it is possible to reflect visible light in a wide wavelength range. Such a configuration may be adopted when it is more desirable to expand the wavelength range that can be reflected than to increase the intensity of the reflected light or to suppress transmission of light through the sheet unit 10. When the peak wavelengths of the reflected light of the two light control sheets 11 and 12 in the first state are different from each other, the optical rotation of the liquid crystal composition in the light control sheets 11 and 12 may be the same.

The sheet unit 10 may only be provided with one light control sheet. That is, the sheet unit 10 may include the first light control sheet 11, but not include the second light control sheet 12. In this case, when the light control sheet 11 is in the first state, a portion of the incident light is reflected by the sheet unit 10. According to the sheet unit 10 having such a configuration, it is also possible to project an image using a reflection-type projection system, and to block light using a light control window. Such a configuration may be adopted when it is more desirable to simplify the configuration of the sheet unit 10 than to increase the intensity of the reflected light or to suppress transmission of light through the sheet unit 10.

The first application example and the second application example may be used in combination with each other. That is, a user may use the sheet unit 10 in the first state as a screen or to block light depending on the situation. Furthermore, the sheet unit 10 in the second state may be used as a screen of a transmission-type projection system. That is, the projection light is irradiated from the opposite side to the observer with respect to the sheet unit 10. Further, the image is observed by the observer as a result of the scattered light that emerges from the sheet unit 10 being observed by the observer.

The light control device 100 may control the sheet unit 10 to one of the first state and the third state and may not have to switch the sheet unit 10 to the second state. If switching between the first state and the third state is possible, it is possible to switch between a state in which the sheet unit 10 reflects visible light, and a state in which visible light is transmitted. That is, in the screen system, it is possible to switch between a state in which an image can be projected on the sheet unit 10, and a state in which the sheet unit 10 is transparent. Furthermore, in the light control window, it is possible to switch between a state where the sheet unit 10 blocks light, and a state in which the sheet unit 10 is transparent. Therefore, it is possible to use the light control sheet in applications that are different to those of a conventional light control sheet that can be switched between the transmitting state and the scattering state.

A light control sheet includes a light control layer containing a liquid crystal composition, and a pair of transparent electrode layers that sandwich the light control layer, and a drive voltage is applied between the pair of transparent electrode layers. Because the alignment state of liquid crystal molecules changes depending on the presence or absence of an applied drive voltage, it is possible to switch between a transmission state in which light is transmitted through the light control layer, and a scattering state in which light is scattered by the light control layer (for example, see JP 2018-45135 A).

The light control sheet described above is attached to a transparent plate that functions as a window glass, a partition, or the like. By switching between the transmission state and the scattering state, it is possible to switch between a state in which the visibility behind the transparent plate is high, and a state in which the visibility behind the transparent plate is low. On the other hand, if it is possible to switch an optical characteristic of a light control sheet that is different from switching between the transmission state and the scattering state, it is possible to realize a light control sheet having a function that is different from switching between high and low visibility, and therefore, it is expected that new applications for light control sheets will emerge.

A light control device according to an embodiment of the present invention includes a light control sheet, and a control unit that controls application of a voltage to the light control sheet, wherein the light control sheet includes a first transparent electrode layer, a second transparent electrode layer, and a light control layer, which is positioned between the first transparent electrode layer and the second transparent electrode layer, and includes a transparent polymer layer that separates voids, and a liquid crystal composition that is a chiral nematic liquid crystal having positive dielectric anisotropy and is held in the voids, and processing performed by the control unit includes setting the light control sheet to a first state in which visible light is reflected by controlling a voltage between the first transparent electrode layer and the second transparent electrode layer to a first voltage, and setting the light control sheet to a third state in which visible light is transmitted by controlling the voltage between the first transparent electrode layer and the second transparent electrode layer to a third voltage, which is greater than the first voltage.

A light control sheet according to an embodiment of the present invention includes: a first transparent electrode layer; a second transparent electrode layer; and a light control layer, which is positioned between the first transparent electrode layer and the second transparent electrode layer, and includes a transparent polymer layer that separates voids, and a liquid crystal composition that is a chiral nematic liquid crystal having positive dielectric anisotropy and is held in the voids; wherein the light control sheet includes a first state in which the light control sheet reflects visible light, the first state being a state in which the liquid crystal composition exhibits a planar state by controlling a voltage between the first transparent electrode layer and the second transparent electrode layer to a first voltage, a second state in which the light control sheet scatters visible light, the second state being a state in which the liquid crystal composition exhibits a focal conic state by controlling the voltage between the first transparent electrode layer and the second transparent electrode layer to a second voltage, which is greater than the first voltage, and a third state in which the light control sheet transmits visible light, the third state being a state in which the liquid crystal composition exhibits a homeotropic state by controlling the voltage between the first transparent electrode layer and the second transparent electrode layer to a third voltage, which is greater than the second voltage, and a helical pitch P (m), an ordinary refractive index no, and an extraordinary refractive index ne of the liquid crystal composition satisfy the following equation (1).

$$0.4 \leq P \times (ne+2no)/3 \leq 0.8 \quad (1)$$

A screen system according to an embodiment of the present invention includes the light control device described above, and includes: a screen provided with a first light control sheet and a second light control sheet; a first projection device that irradiates light toward the first light control sheet; and a second projection device that irradiates light toward the second light control sheet from the opposite side to the first projection device with respect to the screen.

A light control window according to an embodiment of the present invention includes the light control device above, and a window to which the light control sheet above is attached.

Obviously, numerous modifications and variations of the present invention are possible in light of the above teachings. It is therefore to be understood that within the scope of the appended claims, the invention may be practiced otherwise than as specifically described herein.

The invention claimed is:

1. A light control device, comprising:

a light control sheet; and a control unit comprising circuitry configured to control application of a voltage to the light control sheet, wherein the light control sheet includes a first transparent electrode layer, a second transparent electrode layer, and a light control layer positioned between the first transparent electrode layer and the second transparent electrode layer, the light control layer of the light control sheet includes a transparent polymer layer having a plurality of voids, and a liquid crystal composition comprising a chiral nematic liquid crystal having positive dielectric anisotropy such that the liquid crystal composition is held in the voids, the light control sheet is formed such that a helical pitch P in μm, an ordinary refractive index no, and an extraordinary refractive index ne of the liquid crystal composition in the light control sheet satisfy 0.4≤P×(ne+2no)/3≤0.8, and the circuitry of the control unit is configured to apply a first voltage such that the light control sheet is set to a first state in which visible light is reflected, and apply a third voltage such that the third voltage is greater than the first voltage and that the light control sheet is set to a third state in which the visible light is transmitted.

2. The light control device according to claim 1, wherein the circuitry of the control unit is configured to apply a second voltage such that the second voltage is greater than the first voltage and less than the third voltage and that the light control sheet is set to a second state in which visible light is scattered.

3. The light control device according to claim 1, wherein the light control sheet is formed such that a proportion of a region in the light control layer in which liquid crystal molecules in the liquid crystal composition have a horizontal alignment is 50% or more in the first state of the light control sheet.

4. The light control device according to claim 1, wherein the light control sheet is formed such that a proportion of the transparent polymer layer in the light control layer of the light control sheet is less than 50%.

5. The light control device according to claim 1, wherein the light control sheet is formed such that a refractive index np of a polymer material forming the transparent polymer layer in the light control sheet and an ordinary refractive index no of the liquid crystal composition satisfy 0.98≤np/no≤1.02.

6. The light control device according to claim 1, wherein the light control sheet includes a first alignment layer comprising a horizontal alignment film and sandwiched between the first transparent electrode layer and the light control layer, and a second alignment layer comprising a horizontal alignment film and sandwiched between the second transparent electrode layer and the light control layer.

7. The light control device according to claim 1, comprising:

a second light control sheet comprising a first transparent electrode layer, a second transparent electrode layer, and a light control layer positioned between the first transparent electrode layer and the second transparent electrode layer, wherein the light control layer of the second light control sheet includes a transparent polymer layer having a plurality of voids, and a liquid crystal composition comprising a chiral nematic liquid crystal having positive dielectric anisotropy such that the liquid crystal composition is held in the voids, and the circuitry of the control unit is configured to apply the first voltage such that the second light control sheet is set to the first state.

8. The light control device according to claim 7, wherein the circuitry of the control unit is configured to apply at least one of the second voltage such that the second light control sheet is set to the second state and the third voltage such that the second light control sheet is set to the third state.

9. A screen system, comprising:

a screen; and the light control device of claim 1 formed such that the screen has the light control sheet and that an image is projected on the light control sheet in the first state.

10. A screen system, comprising:

a screen;

the light control device of claim 7 formed such that the screen has the first light control sheet and the second light control sheet;

a first projection device configured to irradiate light toward the first light control sheet; and a second projection device configured to irradiate light toward the second light control sheet from an opposite side to the first projection device with respect to the screen.

11. A light control window, comprising:

a window; and the light control device of claim 1 formed such that the light control sheet of the light control device is attached to the window.

12. The light control device according to claim 2, wherein the light control sheet is formed such that a proportion of a region in the light control layer in which liquid crystal molecules in the liquid crystal composition have a horizontal alignment is 50% or more in the first state of the light control sheet.

13. The light control device according to claim 2, wherein the light control sheet is formed such that a proportion of the transparent polymer layer in the light control layer of the light control sheet is less than 50%.

14. The light control device according to claim 2, wherein the light control sheet is formed such that a refractive index np of a polymer material forming the transparent polymer layer in the light control sheet and an ordinary refractive index no of the liquid crystal composition satisfy 0.98≤np/no≤1.02.

15. The light control device according to claim 2, wherein the light control sheet includes a first alignment layer comprising a horizontal alignment film and sandwiched between the first transparent electrode layer and the light control layer, and a second alignment layer comprising a horizontal alignment film and sandwiched between the second transparent electrode layer and the light control layer.

16. A light control sheet, comprising:

a first transparent electrode layer;

a second transparent electrode layer; and a light control layer positioned between the first transparent electrode layer and the second transparent electrode layer and comprising a transparent polymer layer and a liquid crystal composition such that the transparent polymer layer has a plurality of voids and that the liquid crystal composition includes a chiral nematic liquid crystal having positive dielectric anisotropy and is held in the voids, wherein the light control sheet is configured to reflect visible light in a first state in which the liquid crystal composition exhibits a planar state when a first voltage is applied between the first and second transparent electrode layers, scatter the visible light in a second state in which the liquid crystal composition exhibits a focal conic state when a second voltage which is greater than the first voltage is applied between the first and second transparent electrode layers, and transmit the visible light in a third state in which the liquid crystal composition exhibits a homeotropic state when a third voltage which is greater than the second voltage is applied between the first and second transparent electrode layers, and a helical pitch P in μm, an ordinary refractive index no, and an extraordinary refractive index ne of the liquid crystal composition satisfy $0.4 \leq P \times (ne+2no)/3 \leq 0.8$.

* * * * *